(12) United States Patent
Gordon et al.

(10) Patent No.: US 7,650,196 B2
(45) Date of Patent: *Jan. 19, 2010

(54) PRODUCTION MONITORING AND CONTROL SYSTEM HAVING ORGANIZATIONAL STRUCTURE-BASED PRESENTATION LAYER

(75) Inventors: Kevin G. Gordon, Annacis Island Delta (CA); Clifton H. Bromley, New Westminister (CA); Eric G. Dorgelo, Port Moody (CA); Douglas J. Reichard, Fairview, OH (US); Marc D. Semkow, Burnaby (CA); Shafin A. Virji, Vancouver (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 393 days.

This patent is subject to a terminal disclaimer.

(21) Appl. No.: 11/239,925

(22) Filed: Sep. 30, 2005

(65) Prior Publication Data

US 2007/0078536 A1    Apr. 5, 2007

(51) Int. Cl.
    *G05B 15/00*      (2006.01)
    *G05B 11/01*      (2006.01)
    *G06F 3/00*      (2006.01)

(52) U.S. Cl. .................. 700/83; 700/17; 715/762; 715/744

(58) Field of Classification Search .......... 700/83, 700/17; 726/2; 715/762, 763, 744; 704/275
See application file for complete search history.

(56) References Cited

U.S. PATENT DOCUMENTS

| | | | |
|---|---|---|---|
| 5,724,506 A | 3/1998 | Cleron et al. | |
| 5,737,591 A | 4/1998 | Kaplan et al. | |
| 5,802,515 A | 9/1998 | Adar et al. | |
| 5,812,773 A | 9/1998 | Norin | |
| 6,192,357 B1 | 2/2001 | Krychniak | |
| 6,311,187 B1 | 10/2001 | Jeyaraman | |
| 6,477,434 B1 | 11/2002 | Wewalaarachchi et al. | |
| 6,539,271 B2 | 3/2003 | Lech et al. | |
| 6,643,555 B1 * | 11/2003 | Eller et al. | 700/83 |
| 6,769,095 B1 | 7/2004 | Brassard et al. | |

(Continued)

FOREIGN PATENT DOCUMENTS

GB      2407243 A      4/2005

(Continued)

OTHER PUBLICATIONS

European Search Report dated Nov. 12, 2009 for European Patent Application Serial No. 06020458.3 -2206, 6 Pages.

*Primary Examiner*—Albert DeCady
*Assistant Examiner*—Steven R Garland
(74) *Attorney, Agent, or Firm*—Turocy & Watson LLP; Alexander R. Kuszewski

(57) ABSTRACT

A human-machine interface generation system comprises a reception component that receives a request to generate a human-machine interface relating to at least one of an industrial system, device, process, and sub-process and parameters associated with an initiator of the request. A view generation component generates the human-machine interface based at least in part upon the request and the parameters. For example, the system can further comprise a query generation component that creates a query based at least in part upon the request and the parameters and utilizes the query to extract data from a server within an industrial automation environment.

17 Claims, 18 Drawing Sheets

U.S. PATENT DOCUMENTS

| | | |
|---|---|---|
| 6,834,209 B2 | 12/2004 | Potz et al. |
| 6,938,214 B2 * | 8/2005 | Proulx et al. ................. 715/763 |
| 6,943,665 B2 | 9/2005 | Chornenky |
| 6,950,900 B1 | 9/2005 | McKean et al. |
| 2003/0107588 A1 * | 6/2003 | Elsbree et al. .............. 345/700 |
| 2003/0110040 A1 * | 6/2003 | Holland et al. .............. 704/275 |
| 2004/0006401 A1 | 1/2004 | Tamada et al. |
| 2004/0181442 A1 | 9/2004 | Hensel et al. |
| 2004/0260954 A1 * | 12/2004 | Morse ........................ 713/202 |
| 2005/0021158 A1 | 1/2005 | De Meyer et al. |
| 2005/0154606 A1 | 7/2005 | Terzidis et al. |
| 2005/0155043 A1 * | 7/2005 | Schulz et al. ................. 700/83 |
| 2006/0010246 A1 | 1/2006 | Schulz et al. |

FOREIGN PATENT DOCUMENTS

| | | |
|---|---|---|
| WO | 0070417 A | 11/2000 |

\* cited by examiner

PRODUCTION MONITORING AND CONTROL SYSTEM HAVING ORGANIZATIONAL STRUCTURE-BASED PRESENTATION LAYER

TECHNICAL FIELD

The subject invention relates to industrial control systems and, more particularly, to human-machine interfaces (HMIs).

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

To quickly and easily effectuate control of a system or process within industrial automation environments, equipment manufacturers typically create specialized human-machine interfaces (HMIs) that are employed by operators to deliver commands to industrial systems/processes and/or receive data from industrial systems/processes. In other words, HMIs provide an essential communication link between operators and automation devices, wherein such HMIs enable operators to, among other things, implement and control devices and receive feedback by monitoring device status and health during operation. Without these interfaces, high-level industrial automation would be difficult if not impossible to achieve.

Over time, HMIs have undergone several and drastic changes. For instance, a push-button that commissions and de-commissions a machine is a simplest form of a HMI, and these interfaces have been existent for several years. Terminals were later designed that displayed text messages to end users, wherein such messages are indicative of a process performed by a server or processor associated with an automation device. For example, a failed device can generate an internal error code representing a determined error which can then be matched with a particular error message. This message can thereafter be displayed to an operator on a display device. Development of client-side processing has enabled graphical depictions of status and control commands to operators, which has shifted a burden from an automated device or associated processor to a client-side graphical user interface. These graphical user interfaces improve an ability of users to access information quickly and easily.

Designers typically generate an HMI for particular devices or programs. Therefore, if an operator wishes to review a particular HMI, they request such HMI from a server and a client device utilized by the operator is provided with the HMI. This HMI is then populated with existing control data. If the operator wishes to view a disparate HMI, such operator can request it from the server. These HMIs are static in that they do not alter with a user or changing conditions within a plant. For example, a first user will be provided with an identical HMI as a second user for a particular device, system, process, and/or sub-process.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Described herein are systems and methodologies for generating robust and customized human-machine interfaces. An individual associated with an industrial automation environment can provide a request for generation of a human-machine interface (HMI), and an identity of such provider can be determined. For example, the identity can be determined through logon procedures, through voice analysis, or any other suitable manner for determining a user identity. Based upon such user identity and the device associated with the user, various other parameters can be ascertained. For instance, user role, location of a device for which an HMI is desirable generated, access privileges, user preferences, time of request, and the like can be determined when the user's identity is determined. Based at least in part upon the user identity and the above-described parameters, a robust and customized HMI can be generated.

For example, a server or other suitable device can include and support an organizational data model, wherein such model is uniform throughout an enterprise. For example, the data model can be hierarchical in nature, and can include units that are representations of particular portions of a factory. Thus, the request to generate an HMI can relate to one of such units. Utilizing such organizational model, generation of the robust, customized HMI is possible. In another example, rather than effectuating a robust data model throughout an enterprise, associations can be manually generated by an IT individual. For example, data associated with particular users can be generated and maintained in a server that is utilized for creation of HMIs.

In another example, if the organizational model is utilized, systems and methods for converting data from a flat data structure to data that conforms to the organizational model are disclosed. For example, templates associated with legacy devices and/or third-party devices can be employed to map data from a first format to data that conforms to the aforementioned model (which can be hierarchical in nature). Moreover, bridging is described herein, where data that conforms to a first industrial protocol can be translated to conform to a second industrial protocol. Thus, data can be collected and retained from multiple devices across multiple networks.

To the accomplishment of the foregoing and related ends, certain illustrative aspects are described herein in connection with the following description and the annexed drawings.

These aspects are indicative, however, of but a few of the various ways in which the principles of the claimed subject matter can be employed, and such matter is intended to include all such aspects and their equivalents. Other advantages and novel features will become apparent from the following detailed description when considered in conjunction with the drawings.

DETAILED DESCRIPTION

Figure 1:
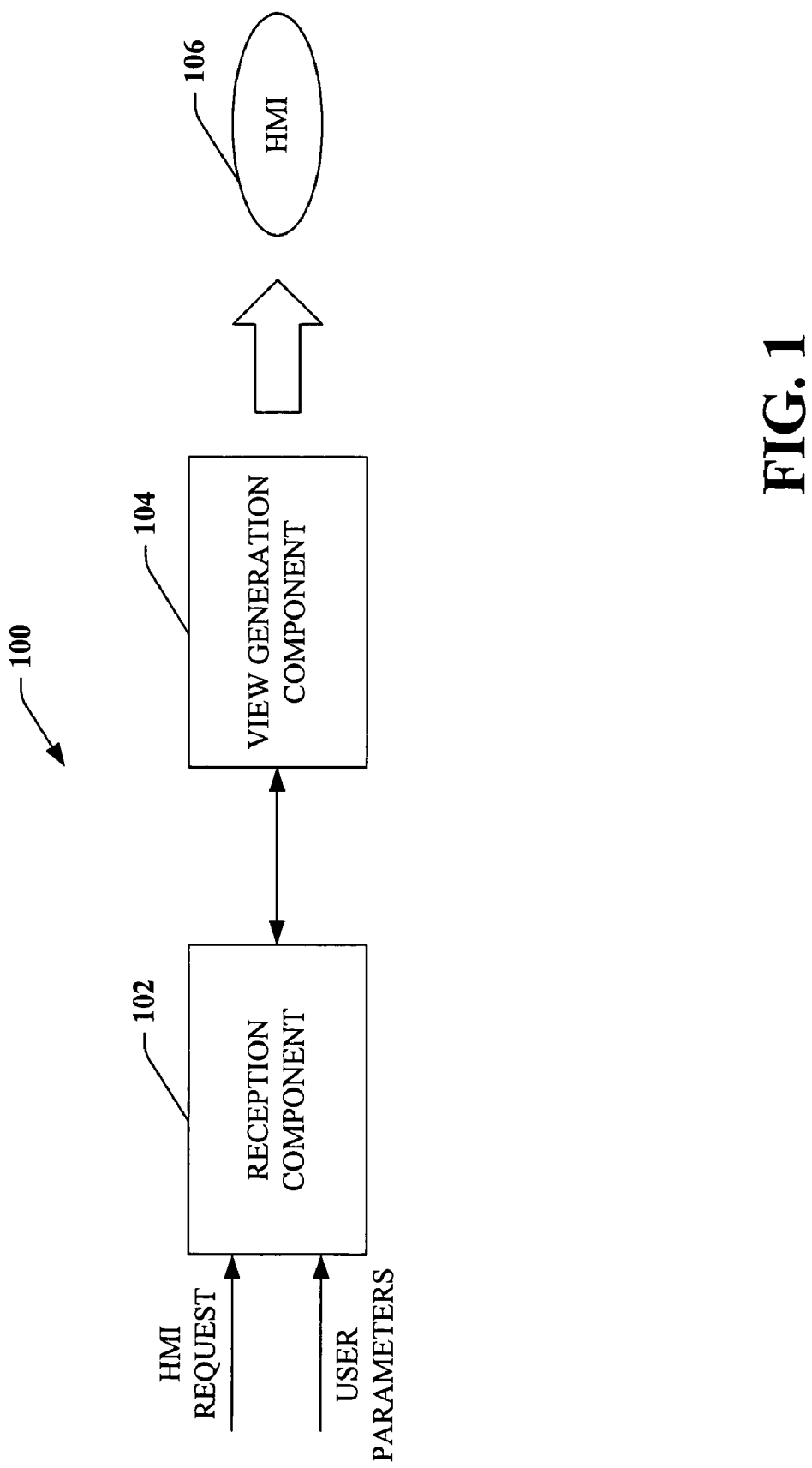
FIG. 1 is a high-level block diagram of a system that facilitates creation of a customized and robust HMI.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates generation of a customized and robust human-machine interface (HMI). The system 100 includes a reception component 102 that receives a request to generate an HMI. For example, the HMI request can be provided by an operator and relate to a particular device, system, process, and/or sub-process within an industrial environment. In a specific example, the HMI request can relate to a pump, a collection of pumps, presses, conveyors, or any other suitable collection of devices. The reception component 102 can further receive user parameters relating to the provider of the request for creation of the HMI. These parameters can be explicitly provided by the operator upon solicitation by the reception component 102 or any other suitable component. For instance, the reception component can generate inquiries and relay such inquiries to the provider of the request, wherein the inquiries can be text-based, audio-based, or any other suitable manner of presenting the provider of the request with the aforementioned inquiries. The initiator of the request can then provide the reception component 102 with answers to the inquiries, wherein such answers relate to the user parameters. In another example, the reception component 102 can determine an identity associated with an initiator of the request and thereafter access a database that includes parameters associated with the user identity. For example, the user parameters can include user identity, user location, user role (e.g., whether the user is an operator, associated with maintenance, . . . ), time of the request, user preferences, a display device that will be displaying the HMI, and any other suitable parameters. It is understood that any suitable manner of providing the user parameters to the reception component 102 is contemplated and intended to fall under the scope of the hereto-appended claims.

The reception component 102 is communicatively coupled to a view generation component 104 that generates a robust and customized HMI 106 based at least in part upon the specified device, system, process, and/or sub-process provided in the request for the HMI 106 and the user parameters. Thus, for example, an HMI generated by the view generation component 104 for a first user can differ from an HMI generated by the view generation component 104 for a second user. In another example, due to capabilities inherent with particular display devices (e.g., screen size, resolution, color capabilities, processing capabilities, ...), the HMI 106 can be disparate for a same user on separate devices.

To enable such robust and customized generation of the HMI 106, the view generation component 104 can access a data store that includes various associations depending upon the system, device, process, and/or sub-process, as well as user parameters, and the view generation component 104 can sequentially filter data based at least in part upon such parameters and selected industrial entity. In more detail, the view generation component 106 can create a subset of data for a specified device. This subset can then be filtered based upon user identity (e.g., for security purposes), and thereafter filtered based upon user role, and then filtered based upon user preferences, etc. Thus continuously filtered subsets of data can be created by the view generation component 104, and a final portion of such data can be employed to generate the HMI 106. Moreover, the view generation component 104 can create necessary communications connections to facilitate control of a system, device, process, and/or sub-process through utilization of the HMI 106.

Figure 2:
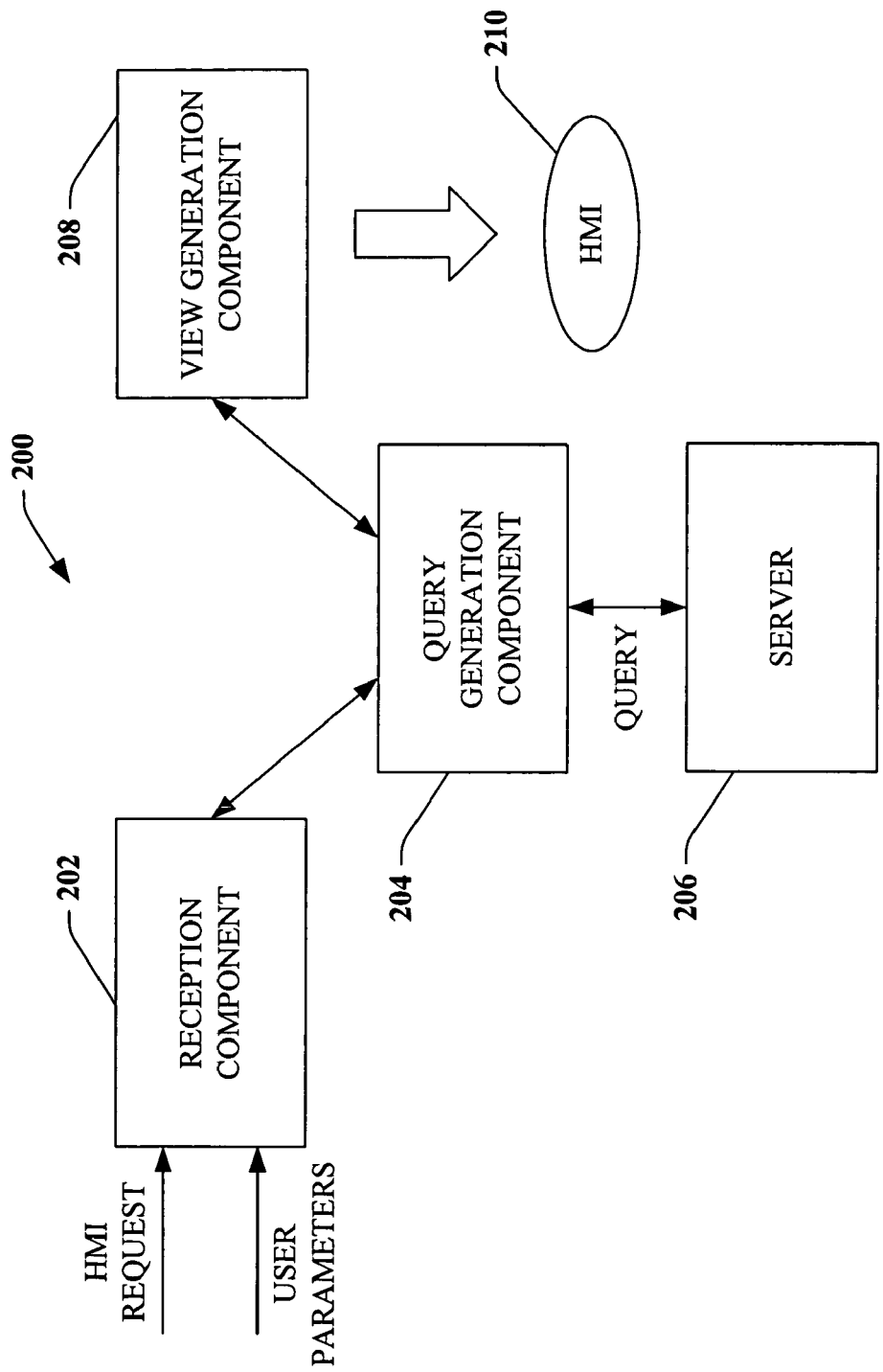
FIG. 2 is a block diagram of a system that facilitates creation of an HMI through querying a database, the queries relate to user parameters.

Referring now to FIG. 2, a system 200 that facilitates generation of a robust HMI for utilization in an industrial automation environment is illustrated. The system 200 includes a reception component 202 that receives a request for generating an HMI, wherein the request identifies a system, device, process, or sub-process for which the HMI is desirably generated. The reception component 202 can further receive parameters relating to an initiator of the request, including time of request, physical location of the individual making the request, preferences of the provider of the request, display device upon which the HMI will be presented, role of the initiator of the request in a plant, and any other suitable parameter. The reception component 202 can relay received information to a query generator 204, which can then create one or more queries based at least in part upon the information received by the reception component 202. For instance, the query generator 204 can create a succession of queries to obtain data necessary to create the HMI and/or can utilize the information to create a single query. The query can be provided to a server 206 that houses at least one database, wherein the database includes data that can be employed in connection with generation of an HMI. For example, the server 206 can include information relating to plant hierarchy, location of entities within a plant, association between entities, and any other suitable data. This information can be generated manually by an Information Technology engineer and/or be automatically generated during design and implementation of one or more control processes.

For example, the server 206 can include data relating to a control process that conforms to a hierarchically structured data model, such as one that is based at least in part upon Industrial Standard Architecture (ISA) S95, ISA S88, Open Modular Architecture Controls (OMAC), or any suitable combination thereof. In more detail, devices such as controllers can include at least a portion of a schema that enables the controllers to recognize and output data that is structured in accordance with the hierarchically structured data model. The controllers can interact with other controllers as well as higher-level systems, such as an Enterprise Resource Planning (ERP) system. ERP systems typically handle manufacturing, logistics, distribution, inventory, shipping, invoicing, and accounting for a company. The schema referenced above can also be employed by an ERP system associated with the controllers, thereby enabling seamless communication between the controllers and the ERP system. Conventional systems, in contrast, often require ad-hoc programming to map between low-level logic utilized in controllers with more advanced object-oriented programming languages often employed within ERP systems.

The hierarchically structured data model can be designed in such a manner to enable data objects to correspond to a hierarchical arrangement and/or a hierarchical arrangement of processes that occur within the plant. Furthermore, the hierarchically structured data model can be designed in a manner that enables modeling of a plant across system and/or process boundaries. For instance, today's manufacturing facilities include batch processing, continuous processing, discrete processing, as well as inventory processing. Communication of meaningful data between these systems and processes is extremely difficult, as they are often designed and operated without regard for an adjacent process. The hierarchically structured data model can be implemented so that a substantially similar structure is provided with respect to a batch process, a continuous process, a discrete process, and inventory tracking. This uniformity of structure throughout an industrial automation environment enables creation of one or more databases that can be utilized to create customized and robust HMIs.

A view generation component 208 can receive data resulting from the query from the query generator 204, and thereafter utilize such data to create a robust and customized HMI 210. For instance, the HMI 210 can be customized based at least in part upon the user parameters. The view generation component 208 can further create communications between the HMI 210 and, for instance, a device desirably controlled through the HMI 210. Thus, actions undertaken through the HMI 210 can be relayed to the device.

Figure 3:
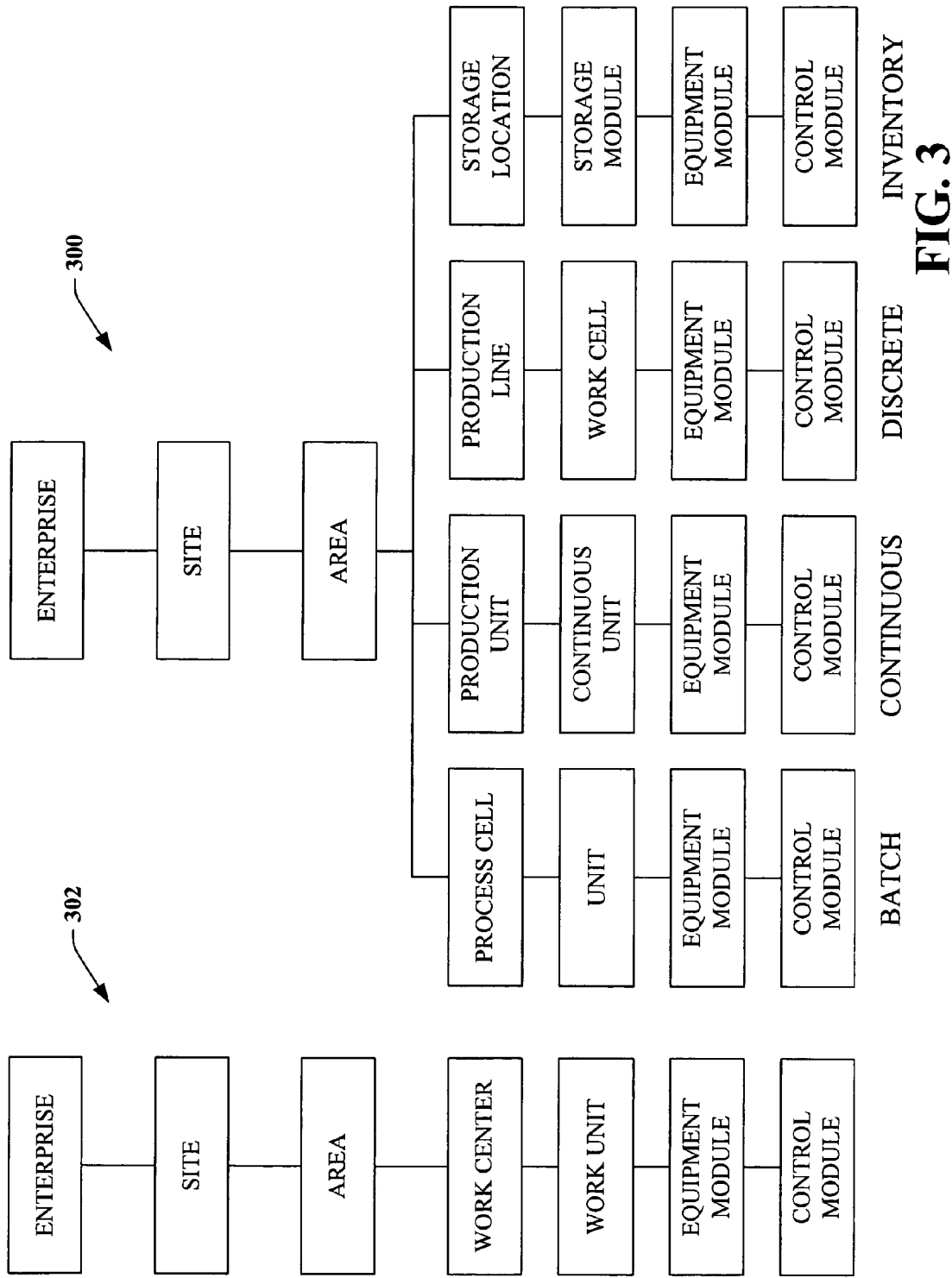
FIG. 3 illustrates exemplary hierarchies that can be utilized in connection with a hierarchically structured data model.

Now turning to FIG. 3, hierarchical representations that can be employed in connection with a schema utilized by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 300 illustrates a representation of equipment within a plant given disparate processes. For instance, a hierarchy in accordance with a batch process can include a representation of an enterprise, site, area, process cell, unit, equipment module, and control module. In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 302 can be utilized that represents each of the aforementioned hierarchical representations. The hierarchy 302 can include representations of an enterprise, a site, an area, a work center, a work unit, an equipment module, and a control module. Thus, a common representation can be generated that adequately represents the hierarchy 300. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 300). Metadata can be employed to enable display of such data in accordance with known, conventional usage of such data. Thus, implementation of a schema in accordance with the hierarchy 302 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 302 (or similar hierarchy) within a controller.

Figure 4:
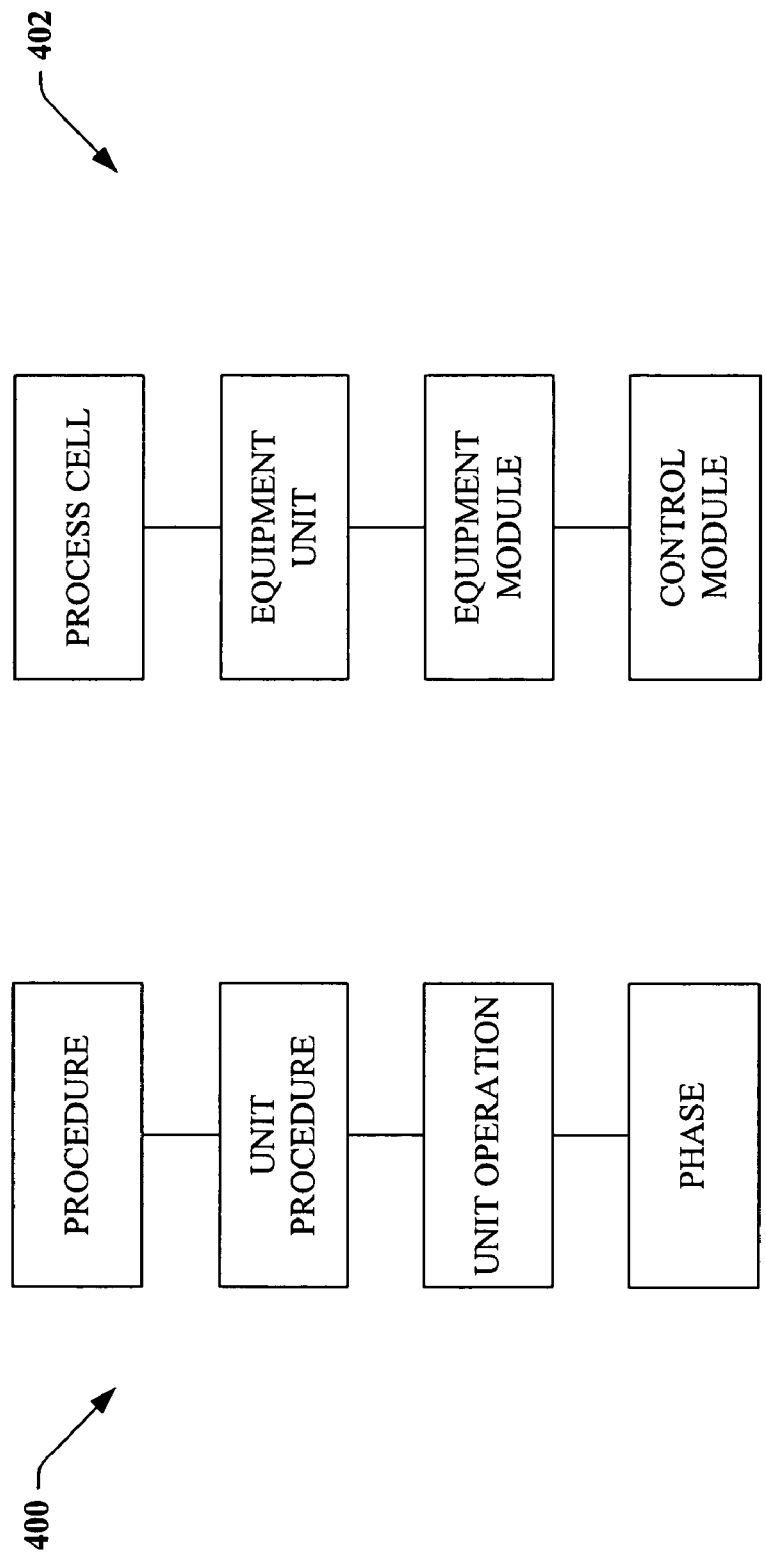
FIG. 4 illustrates exemplary hierarchies that can be utilized in connection with a hierarchically structured data model.

Now referring to FIG. 4, standard hierarchies that can be utilized to represent procedures and equipment are illustrated. In particular, a hierarchy 400 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, and pausing a motor, opening and closing a valve, and the like. A hierarchy 402 relating to a representation of equipment in, for example, a batch process is displayed adjacent to the hierarchy 400. The representations within the hierarchy 402 were described in greater detail with respect to FIG. 3.

Figure 5:
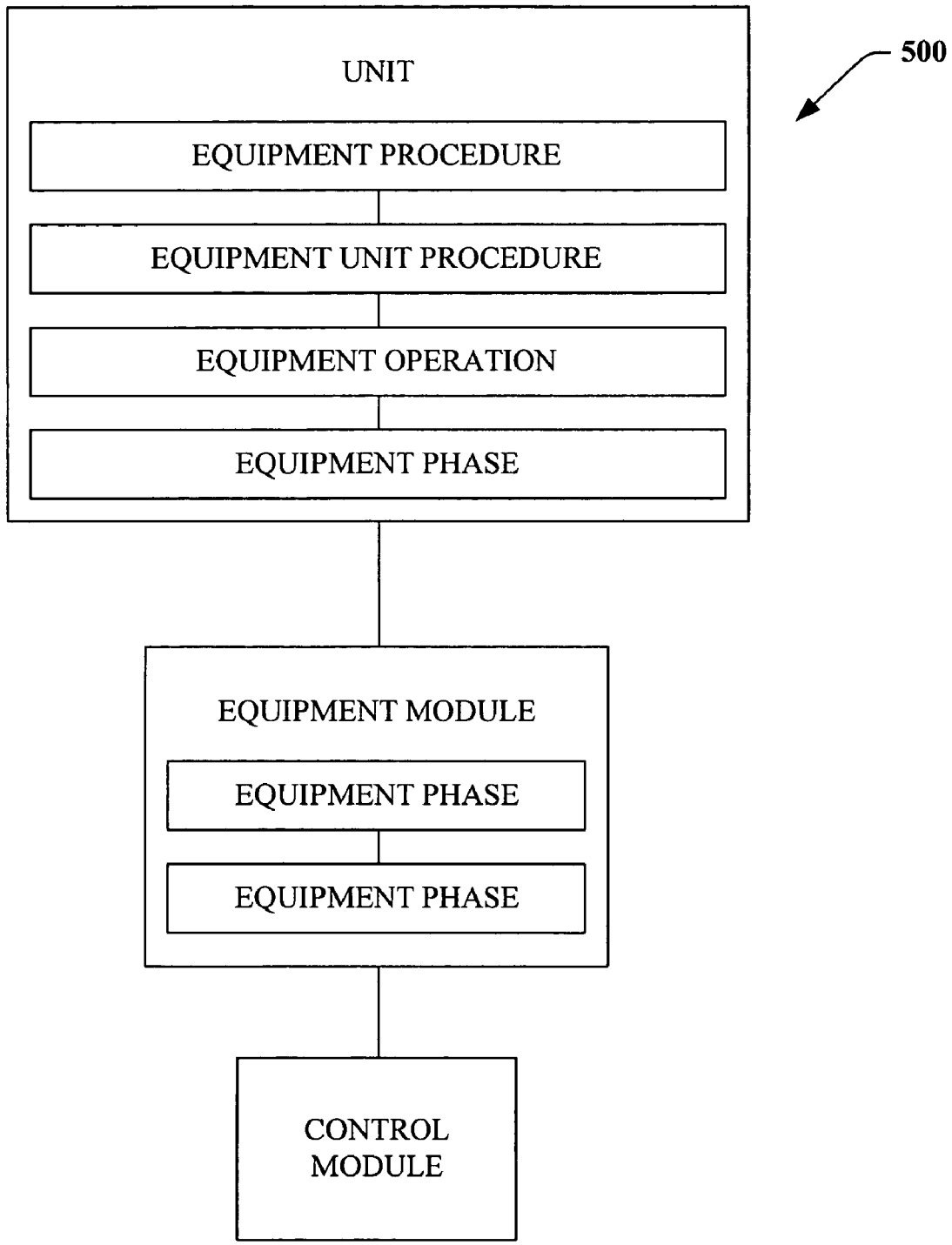
FIG. 5 illustrates an exemplary combination of hierarchies.
Figure 6:
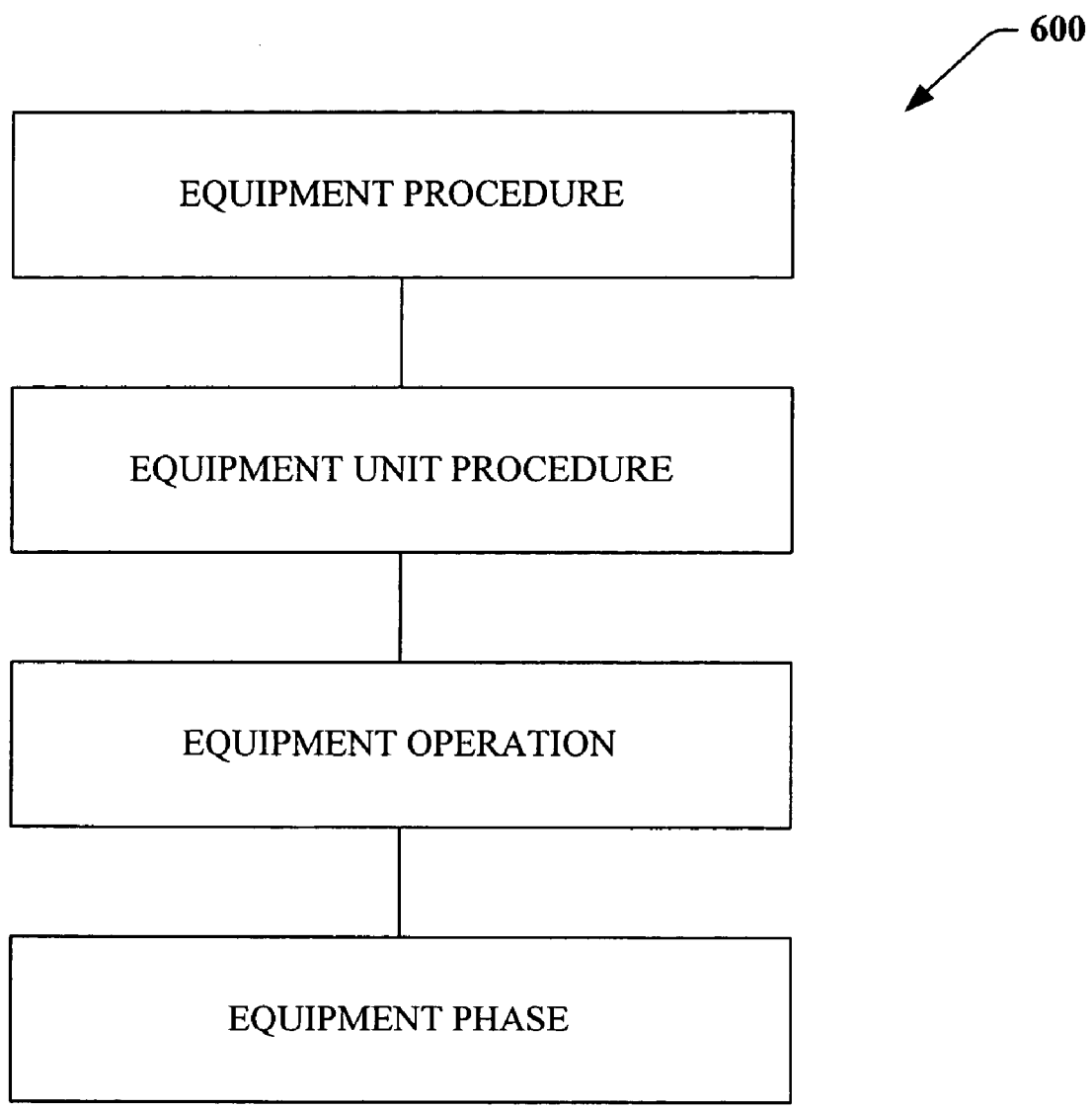
FIG. 6 illustrates an exemplary combination of hierarchies.

Now turning to FIG. 5, a hierarchy 500 that represents one possible integration of the hierarchies 400 and 402 (FIG. 4) is illustrated. A unit (such as a work unit described in FIG. 3) can be associated with an equipment procedure, an equipment unit procedure, an equipment operation, and an equipment phase). Thus, the procedures, operation, and phase can be associated with a particular work unit. An equipment module can be associated with one or more equipment phases, and can be above a control module in the hierarchy. Referring Briefly to FIG. 6, a hierarchy 600 that can be utilized in connection with equipment control is illustrated. The hierarchy is substantially similar to that described within the unit portion of the equipment unit. As stated above, the hierarchies illustrated in FIGS. 3-6 can be based upon a standard, such as ISA S88, ISA S95, OMAC, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 4-6 can be existent within an industrial device (e.g., a controller), together with state machines that enable creation of such objects.

Figure 7:
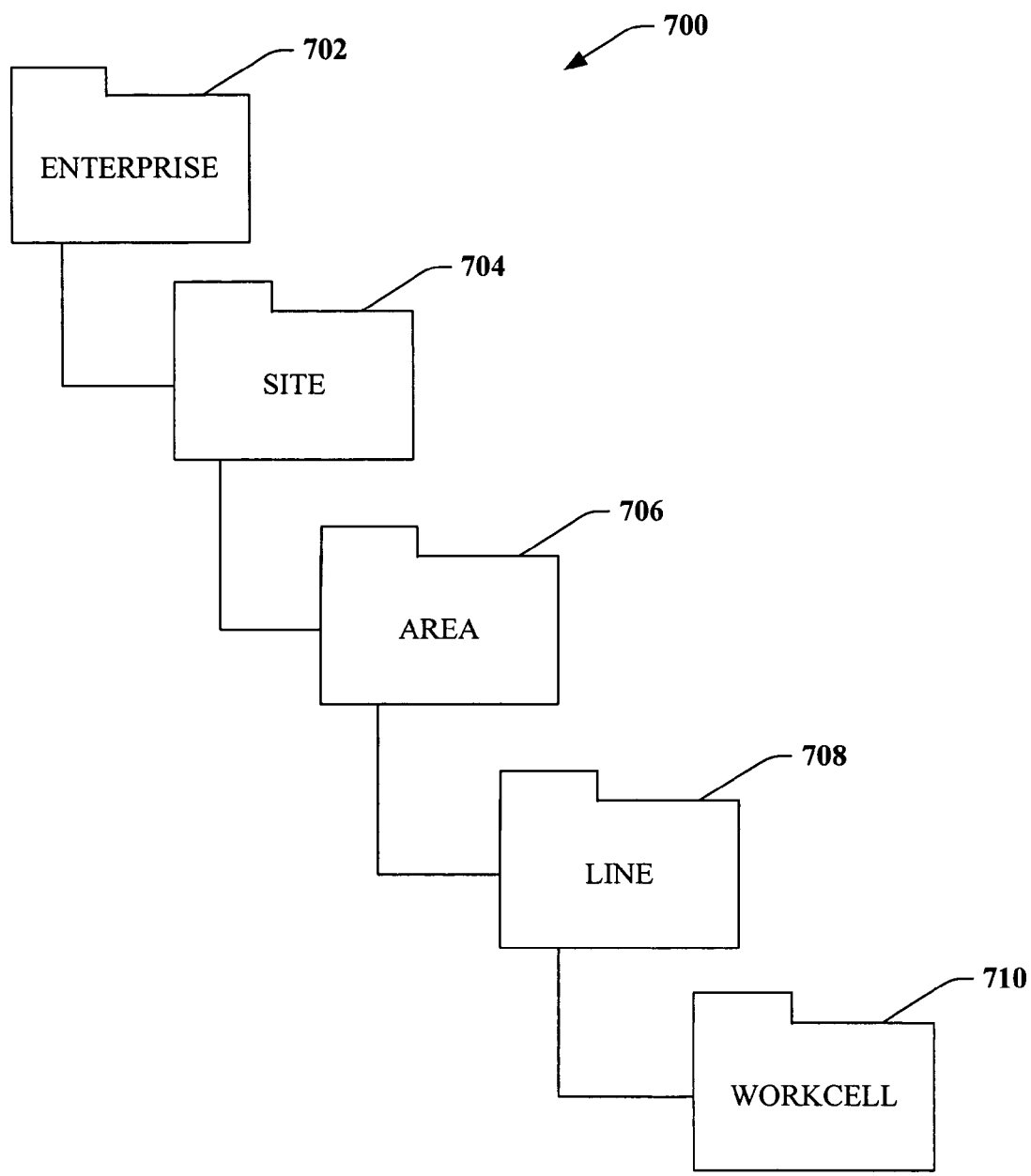
FIG. 7 is a visual representation of an exemplary structure upon which a hierarchically structured data model can be based.

Referring now to FIG. 7, an exemplary hierarchical structure 700 which can be utilized in connection with the hierarchically structured data model described herein is illustrated. For example, the data model can facilitate nested structures, thereby mitigating deficiencies associated with data models that employ flat namespaces. The structure 700 includes an enterprise level 702, where a particular enterprise can be represented within data structured in accordance with a hierarchical data model. Beneath the enterprise level 702 can be a site level 704, so that a particular factory (site) within an enterprise can be represented within a data packet. Beneath the site level 704 an area level 706 can exist, which specifies an area within the factory that relates to the data. A line level 708 can lie beneath the area level 706, wherein the line level 708 is indicative of a line associated with particular data. Beneath the line level 708 a workcell level 710 can exist, thereby indicating a workcell associated with the data. Utilizing a nested, hierarchical data model, PLCs can become more aware of data associated therewith. Furthermore, the hierarchy 700 can be customized by an owner of such hierarchy. For instance, more granular objects/levels can be defined within the hierarchy 700.

Figure 8:
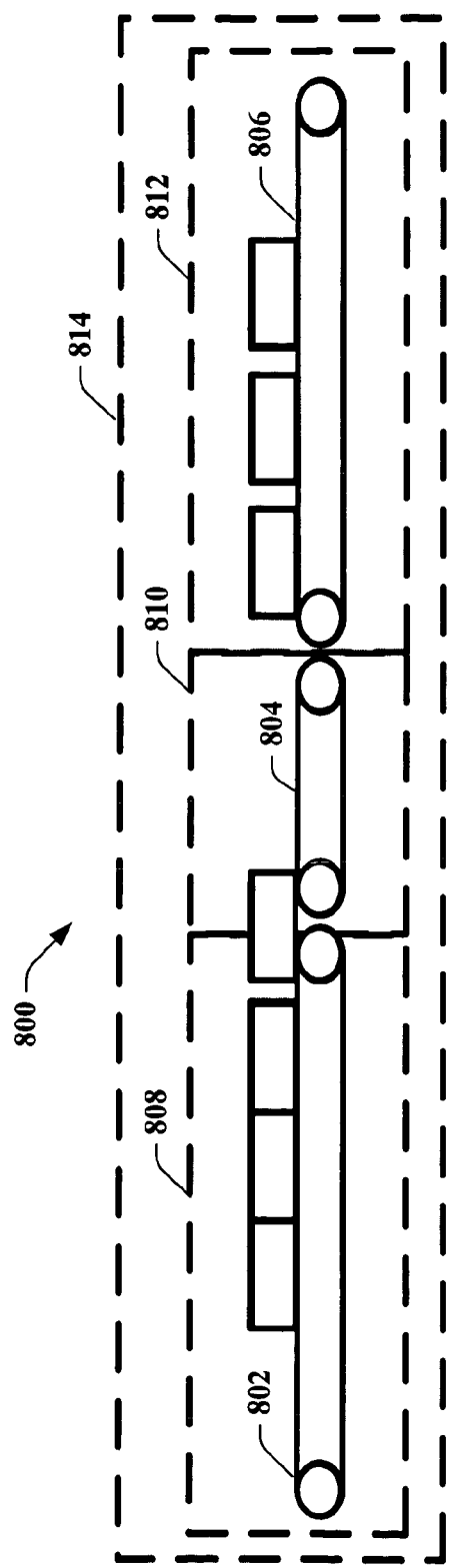
FIG. 8 illustrates a conveyor system that includes equipment modules and control modules.

Now referring to FIG. 8, a system 800 that illustrates exemplary equipment modules and exemplary control modules within a conveyor application is illustrated. The conveyor application includes an in-feed conveyor 802 that provides items to a gap conveyor 804 (which generates gaps of appropriate sizes), which in turn provides gaps to an out-feed conveyor 806. As stated previously, control modules can be defined as low-level motors, valves, and the like and corresponding control logic. Thus, a control module can be a motor that is employed to rotate conveyor belts and control logic associated therewith. Accordingly, the system 800 can include six control modules (six motors and control logic associated therewith). Equipment modules 808-812 can be defined in accordance with the conveyors 802-806. More specifically, the equipment module 808 can relate to the in-feed conveyor 802, the equipment module 810 can relate to the gap conveyor 804, and the equipment module 812 can relate to the out-feed conveyor 806. Moreover, an equipment module 814 can be defined that includes the equipment modules 808-812. A user interface can illustrate the equipment modules and control modules in a hierarchical manner and provide a manner in which to modify the equipment modules 808-814 and/or the control modules therein. For example, a controller can include data objects, interfaces, state machines, and the like that can be modified by a user to edit a control process including such entities.

Figure 9:
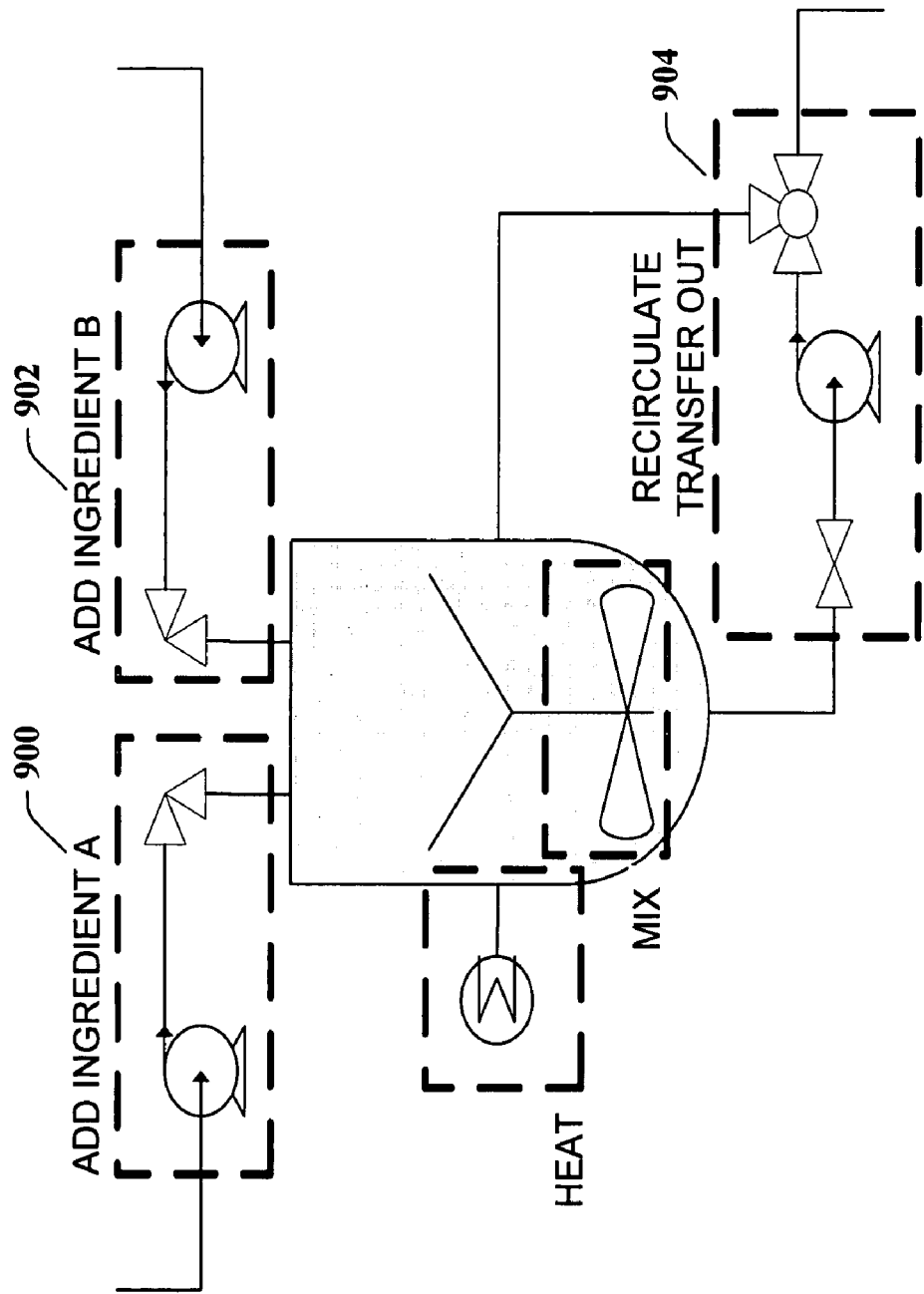
FIG. 9 illustrates a mixing system that includes equipment phases, equipment modules, and control modules.

Referring now to FIG. 9, examples of equipment phases within a mixer application is illustrated. More specifically, an equipment phase represents capabilities of an equipment module (a collection of control modules). For instance, an in-feed can be utilized to add an ingredient to a mixer. Therefore, add ingredient A 900 and add ingredient B 902 are equipment phases. The in-feed itself can be an equipment module, and it is understood that an equipment phase can support one or more equipment modules. An out-feed can be an equipment module, and recirculate and transfer out 904 can be equipment phases (e.g., the out-feed equipment module can be supported by two equipment phases). With greater specificity with regard to equipment phases, for example, equipment phases can be defined as mutually exclusive and/or mutually inclusive. As described above, data objects corresponding to equipment phases can be placed directly within an industrial automation device, rather than being programmed at an MES layer and thereafter mapped to such device.

Figure 10:
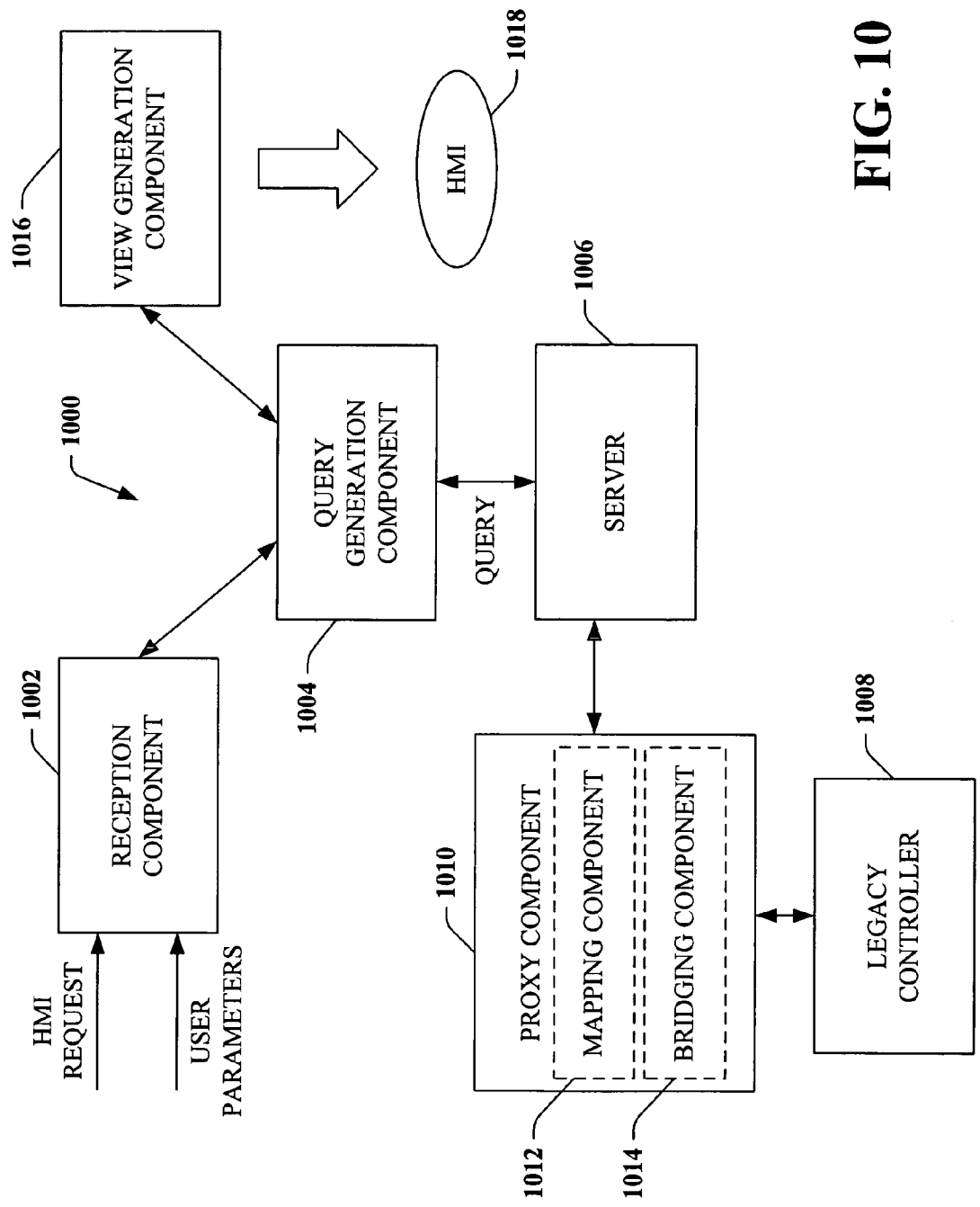
FIG. 10 is a block diagram of a system that facilitates creation of an HMI through utilization of data associated with legacy devices.

Turning now to FIG. 10, a system 1000 that facilitates generation of an HMI is illustrated. For instance, the system 1000 can create an HMI through utilizing data that conforms to a hierarchical data structure, such as that described with respect to FIGS. 3-9. The system 1000 includes a reception component 1002 that receives a request to generate an HMI, wherein the request includes identification of a system, device, process, and/or sub-process for which the HMI is desirably created. The reception component 1002 can further receive user parameters, such as user identity, user role, user location, time of the request, display device capabilities, user preferences, and the like. The HMI request and the user parameters can thereafter be provided to a query generation component 1004 that access a server 1006 to retrieve data that can be utilized in connection with generating an HMI. For instance, the server 1006 can include data that conforms to a hierarchically structured data model, metadata describing associations between data objects and the like.

To utilize a hierarchically structured data model, however, devices within an industrial automation environment must be able to support such data model. In more detail, controllers, smart devices, and the like must be able to receive, execute, and output data that conforms to a hierarchically structured data model. Owners of an enterprise, however, may not wish to replace each legacy device within a plant, as doing so can be quite costly. Still further, many legacy devices may not communicate over similar network protocols. In still further detail, the query generation component 1004 may communicate using the Common Industrial Protocol (CIP) while a legacy controller 1008 may communicate through utilization of Hart, Fieldbus, Foundation Fieldbus, Modbus, ASIbus, or other suitable protocol. Accordingly, a proxy component 1008 can be employed to facilitate utilization of a uniform data model throughout an enterprise, wherein the proxy component 1008 facilitates mapping data from the legacy device 1006 to data that conforms to the hierarchically structured data model. In more detail, the proxy component 1008 can include a bridging component 1010 that operates as a bridge between disparate networks. For example, the legacy device 1008 may be adapted to send/receive data over a first network protocol, such as ProfiBus, ModBus, ASIbus, FieldBus, Foundation FieldBus, Hart, or the like, while it may be desirable for the server 1006 to receive data packaged in conformance with a disparate network protocol, such as CIP. The bridging component 1012 can recognize that data from the legacy device 1008 is packaged in accordance with the first network protocol and thereafter re-package such data so that it conforms to the second network protocol. The bridging component 1012 can be associated with a mapping component 1014 that can reformat the data so that it is in accordance with the hierarchically structured data model. For instance, the mapping component 1014 can access templates associated with the hierarchically structured data model and utilize such templates to map the data so that it conforms to such data model. In other words, the legacy controller 1008 can output data in a flat data structure, and the mapping component 1014 can map such data so that it is hierarchical in nature. Therefore, the server 1006 can include data that is structured in a uniform manner, regardless of whether controllers or devices are legacy devices and/or provided by disparate vendors.

The query generation component 1004 can then receive data based at least in part upon one or more queries provided to the server 1006. This data can include organizational units, such as equipment modules, control modules, or any other suitable units, associations located from user roles, and any other suitable data. Data resultant from the query can then be provided to a view generation component 1016 that can create a robust and customized HMI 1018 based at least in part upon the initial request received by the reception component 1002 and the user parameters.

Figure 11:
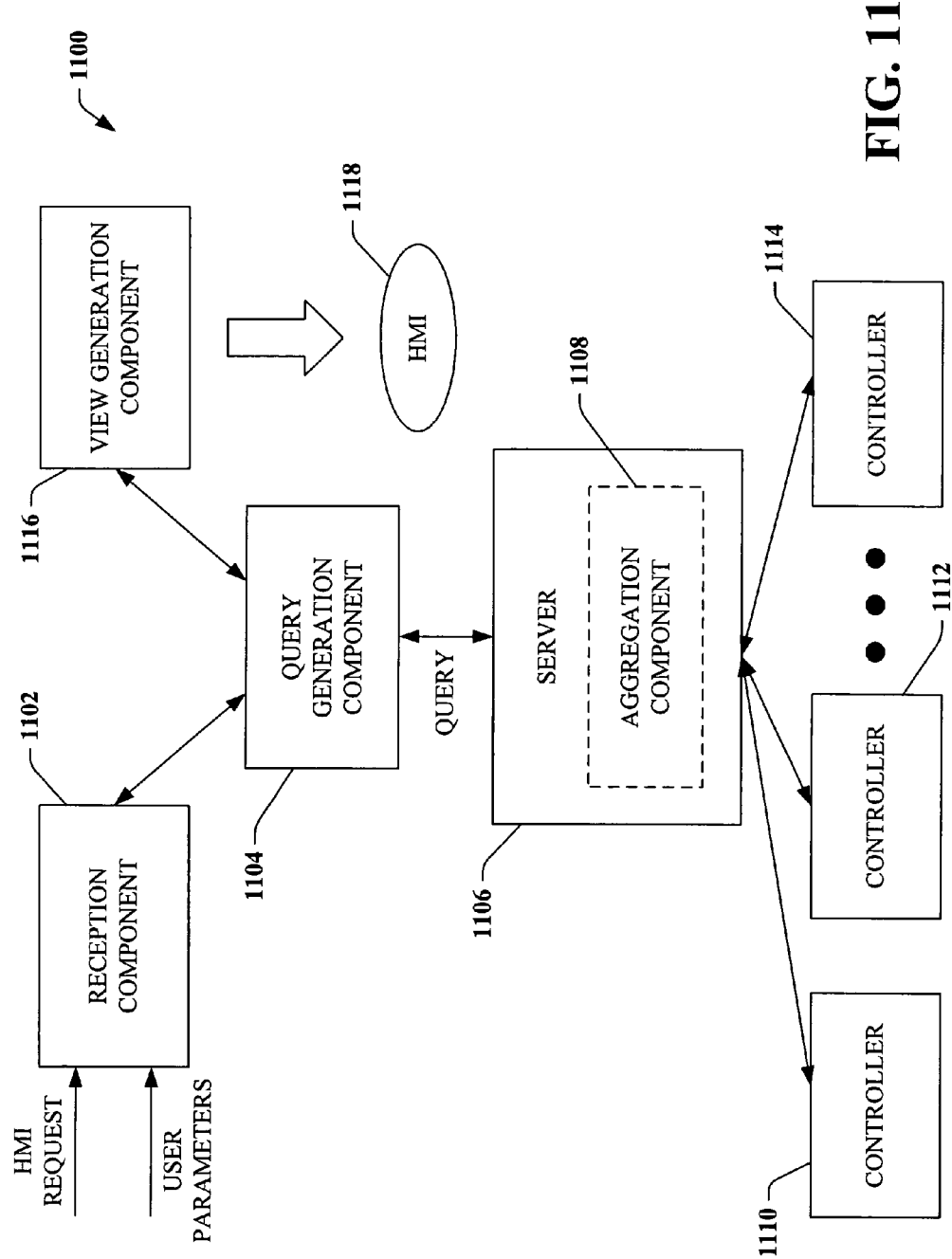
FIG. 11 is a block diagram of a system that facilitates building an HMI through aggregated data.

Referring now to FIG. 11, a system 1100 that facilitates creation of a customized and robust HMI is illustrated. The system 1100 includes a reception component 1102 that receives a request for an HMI and parameters associated with such request. The specificities of the request and the parameters have been described above. The request and the parameters are then provided to a query generation component 1104 that creates a query or a sequence of queries and provides such query to a server 1106, which includes data that can be employed in connection with HMI generation. In more detail, the server 1106 can include templates, graphical depictions of devices, and any other suitable data. The server 1106 can include an aggregation component 1108 that is utilized to receive factory-related data from multiple controllers 1110-1114. More particularly, the controllers 1110-1114 can receive, execute, store, and output data that conforms to a hierarchically structured data model. A collection of such data from each device within an automation environment can enable creation of an accurate representation of a plant. The aggregation component 1108 can be utilized to aggregate data from these controllers 1110-1114. For instance, the aggregation component 1008 can solicit data from the controllers 1110-1114 by periodically querying such controllers 1110-1114 and/or automatically make copies of and collect data objects output by the controllers 1110-1114. Thus, through utilization of the aggregation component 1108, the server 1106 can include a substantial amount of data relating to a factory environment. Data from the server 1008 that is extracted by way of the query generated by the query generator 1104 can then be relayed to a view generation component 1116, which can employ such data to create a robust and customized HMI 1118.

Figure 12:
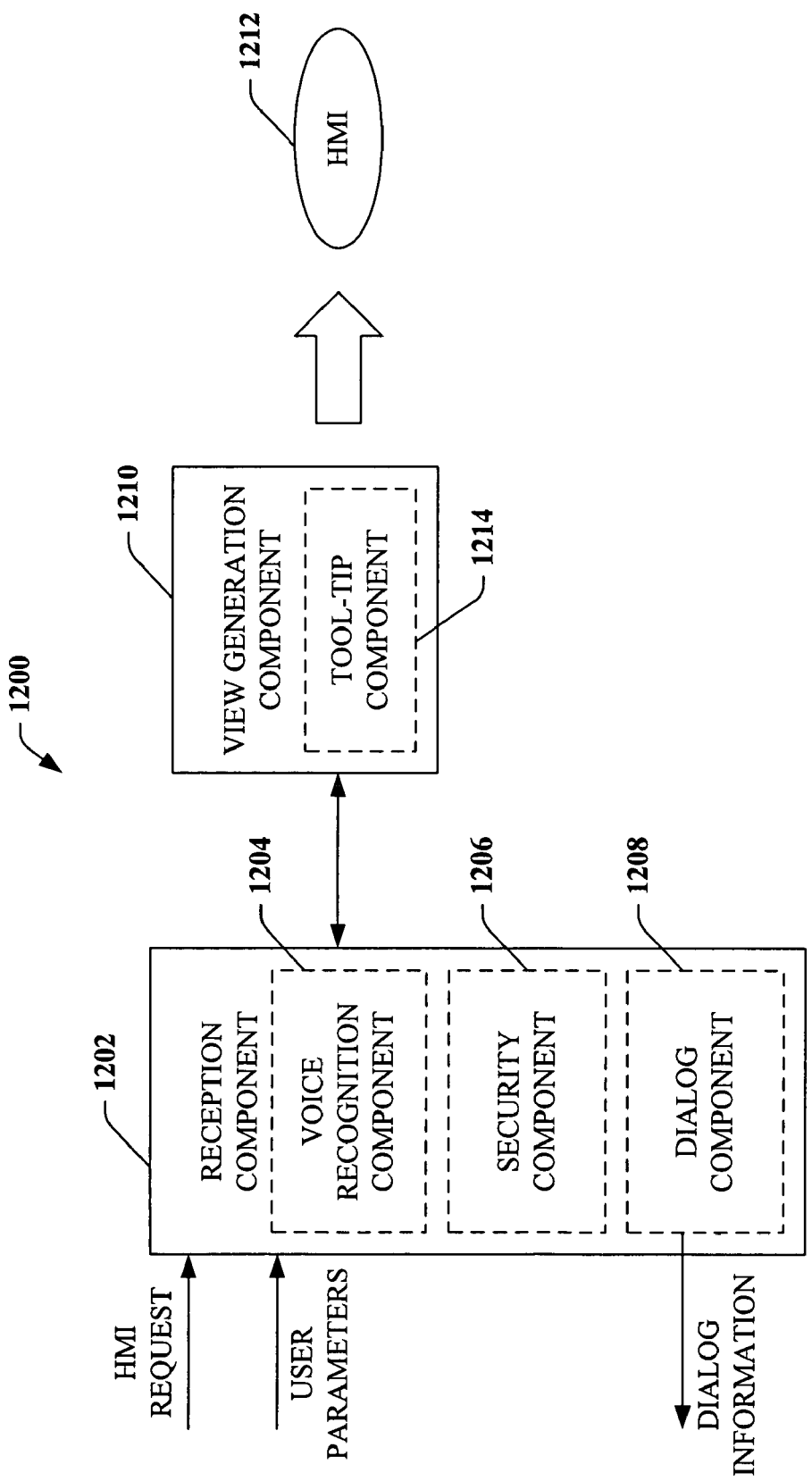
FIG. 12 is a block diagram of a system that facilitates performing a dialog in connection with obtaining sufficient information to generate an HMI.

Turning now to FIG. 12, a system 1200 that facilitates creation of an HMI is illustrated. The system 1200 includes a reception component 1202 that receives a request to generate an HMI with respect to a particular system, device, process, and/or sub-process. For example, the request can be a voice request, and the reception component 1202 can include a voice recognition component 1204 that analyzes and comprehends such request. For instance, the voice recognition component 1204 can determine a device for which a user is requesting an HMI based at least in part upon voice commands provided by the user. Furthermore, the voice recognition component 1204 can recognize identity of a user based upon received voice input. This identity can then be relayed to a security component 1206 that ensures that only authorized personnel can create an HMI through the system 1200. In another example, the security component 1206 can request identifying data from an initiator of the HMI request, such as username, password, personal identification number, digitized biometric indicia, or any other suitable data. The security component 1206 can then analyze the provided data and determine whether the requesting entity is authorized to generate an HMI. For instance, the security component 1206 can review a table that includes identities of entities and authorization levels associated therewith. In another example, a user or entity may wish to provide additional data to a server (not shown) associated with the reception component 1202, and the security component 1206 can ensure that 1) there is physical space available for the data desirably input and 2) the entity is authorized to input the data. Thus, the security component 1206 can monitor physical device parameters as well as user/entity related parameters to ensure proper addition of data to the server. Furthermore, the security component 1206 can consider an entity/user's context, such as entity/user's role (operator, technician, electrician, . . . ), an entity/user's scenario (routine maintenance, plant diagnostics, . . . ), and such context can be input to the security component 1206 and employed to manage access to the system 1200.

If the user is authorized to access the system 1200 (as determined by the security component 1206), the reception component 1202 can receive user parameters relating to the request for the HMI. For instance, at least a portion of such parameters can be associated with user identity. In other words, given a user identity (as determined by the voice recognition component 1204), various other user-related parameters (such as user role, user preferences . . . ) can be determined. A dialog component 1208 can be employed to solicit additional information from the user if such information is necessary to enable creation of an HMI. For instance, the dialog component 1208 can output visual and/or audible signals that represent inquiries to which the user can respond. Data received through the dialog and/or the initial request for generating an HMI can be provided to a view generation component 1210 that can create a robust and customized HMI 1212 based upon the received information. Furthermore, the view generation component 1210 can include a tool-tip component 1214 that facilitates usage of tool-tips in connection with the generated HMI 1212. In more detail, the tool-tip component 1214 can cause a tool-tip to appear upon an operator hovering over a particular portion of the HMI 1212. This can be enabled through metadata or any other suitable means for creating tool-tips.

Figure 13:
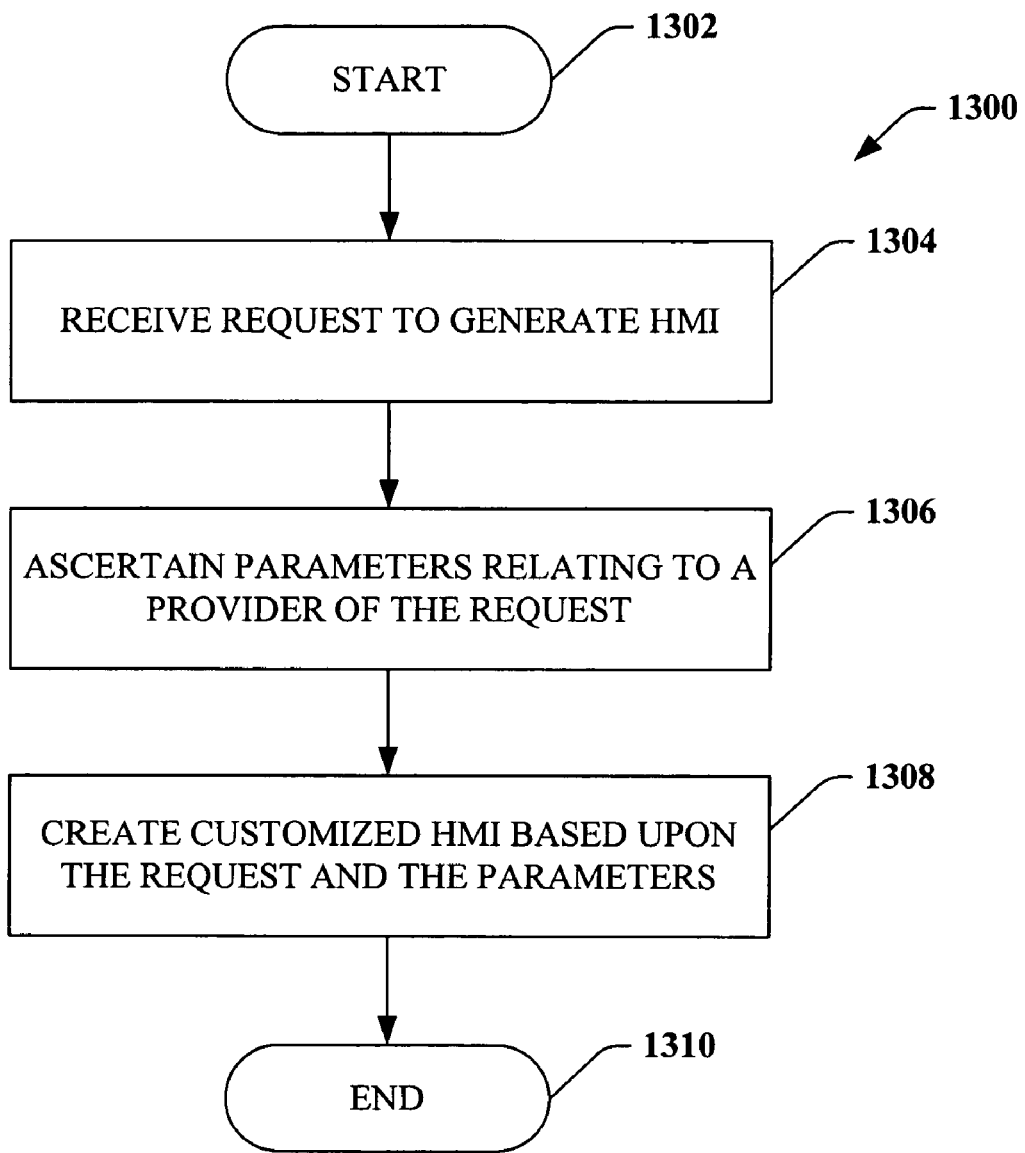
FIG. 13 illustrates a representative flow diagram of a methodology for building a robust and customized HMI based at least in part upon user parameters.
Figure 14:
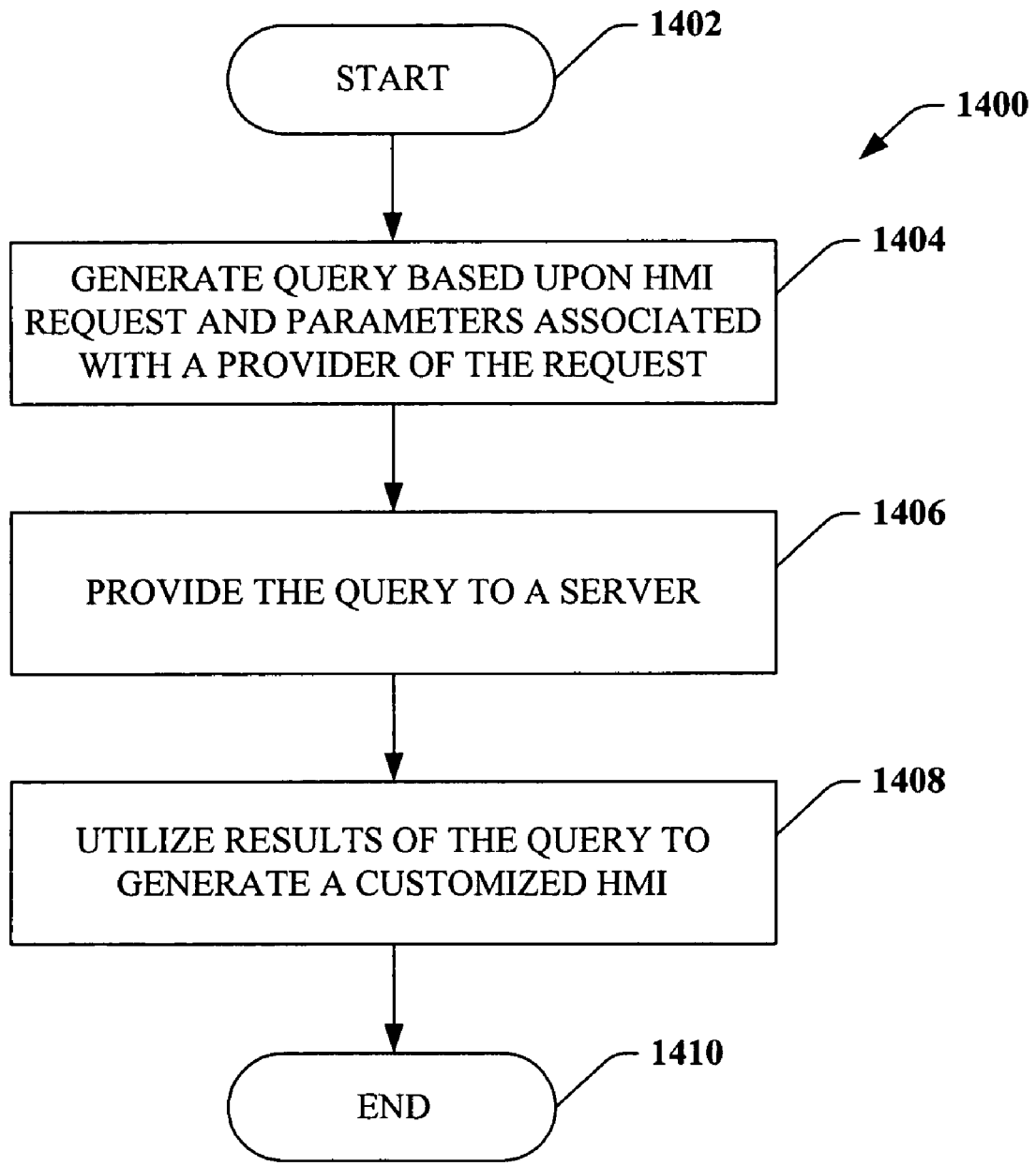
FIG. 14 is a representative flow diagram of a methodology for generating queries that are employed in connection with generating an HMI.
Figure 15:
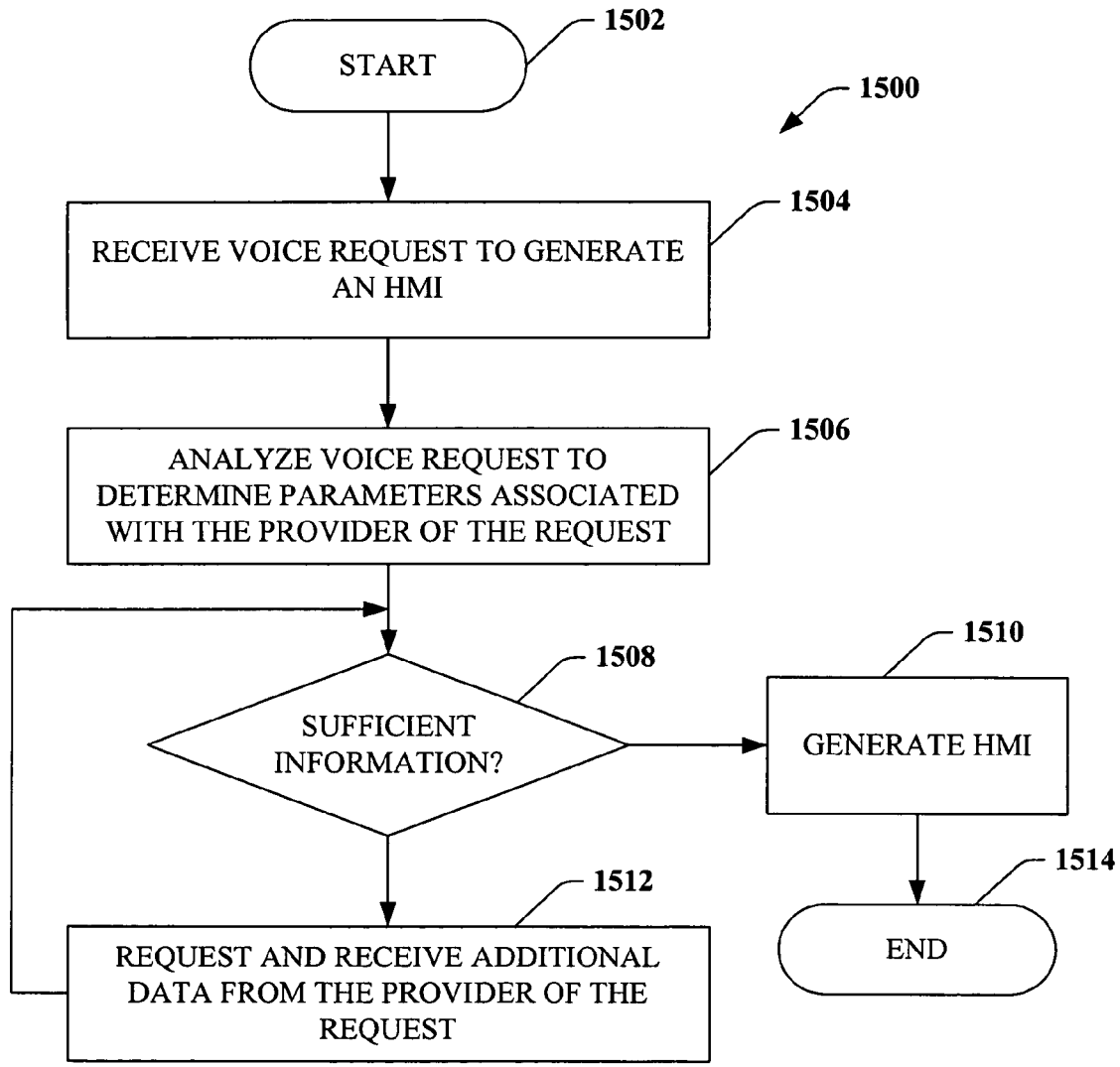
FIG. 15 is a representative flow diagram of a methodology for performing a dialog in connection with obtaining sufficient information to generate an HMI

Referring to FIGS. 13-15, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 13, a methodology 1300 for creating a robust and customized HMI is illustrated. The methodology 1300 begins at 1302, and at 1304 a request to generate an HMI is received. For instance, the request can indicate a system, device, process, and/or sub-process for which an HMI is desirably generated. This request can be provided through voice commands, a mouse, keyboard, or any other suitable manner for generating the request. At 1306, parameters relating to a provider of the request can be ascertained. For instance, an identity associated with a provider of the request, a role associated with such provider, preferences, location of the user, location of a device for which an HMI is desirable created, parameters associated with a display mechanism that will display the HMI, time of the request, or any other suitable parameters. These parameters can be solicited from the provider of the request, automatically determined through utilization of sensors, context, and the like, or determined through querying a database or reviewing a table, or any other suitable manner. At 1308, a customized and robust HMI is created based at least in part upon the request and the received parameters. For instance, templates, graphical depictions of devices, inputs and outputs of devices, and the like can be accessed based upon the request and the received parameters. Furthermore, communications channels can be created between the generated HMI and a system, device, process, and/or sub-process, thereby enabling an operator to control an entity within an industrial environment through the HMI. The methodology 1300 completes at 1310.

Now referring to FIG. 14, a methodology 1400 for utilizing a query to retrieve data for utilization in connection with generating an HMI is illustrated. The methodology 1400 begins at 1402, and at 1404 a query is generated based at least in part upon an HMI request and a parameter associated with a provider of the request. For instance, the request can indicate a system, device, process, and/or sub-process, and the parameter can be associated with a role of the user. The query can be utilized to retrieve data associated with a device for which an HMI is desirable generated as well as data that is associated with a role of the requesting entity. In a particular example, an operator may be authorized to receive disparate data with respect to a device than a maintenance individual. At 1406, the query is provided to a server. The server can include a data repository that houses data relating to an industrial automation environment, where the data can include data relating to organizational units (such as equipment modules, equipment unit procedures, control modules, . . . ), user identities, user roles, user preferences, templates employed to create HMIs, or any other suitable data. Moreover, the server can be a distributed server—it is understood that any suitable configuration for storing data and any suitable configuration of a server is contemplated and intended to fall under the scope of the hereto-appended claims. At 1408, results of the query are employed to create a robust and customized HMI. For instance, templates can be populated based at least in part upon the requested device and associated parameters. The methodology 1400 then completes at 1410.

Turning now to FIG. 15, a methodology 1500 for creating an HMI is illustrated. The methodology 1500 begins at 1502, and at 1504 a voice request for creating an HMI is received. For instance, such request can be received through utilization of a microphone or other suitable device for receiving voice commands. At 1506, the voice request is analyzed to determine parameters associated with a provider of the request. For instance, based upon the voice commands, identity of the provider of such request can be determined. Using the identification information, other parameters can be determined, such as user preferences, user role, and the like. Moreover, sensors can be utilized to determine location of the request, location of a device associated with the request, time of the request, parameters associated with a device that will display the HMI, and the like. At 1508, a determination is made regarding whether additional information is needed to create the HMI. For example, the voice commands may have lacked sufficient specificity to enable generation of the HMI. If sufficient information is existent, then at 1510 an HMI is automatically generated based at least in part upon the request and the parameters. If there is insufficient information, additional information is requested from the user at 1512. For instance, text-based inquiries can be provided to solicit additional information from a user. In a particular example, the request can indicate a device for which an HMI is desirably generated, and additional information such as location of device within a plant, type of device, and the like can be solicited. In another example, audio inquiries can be delivered to the issuer of the request for the HMI. Thereafter the methodology loops to 1508 and repeats until sufficient information is obtained to enable generation of the HMI. The methodology 1500 completes at 1514.

Figure 16:
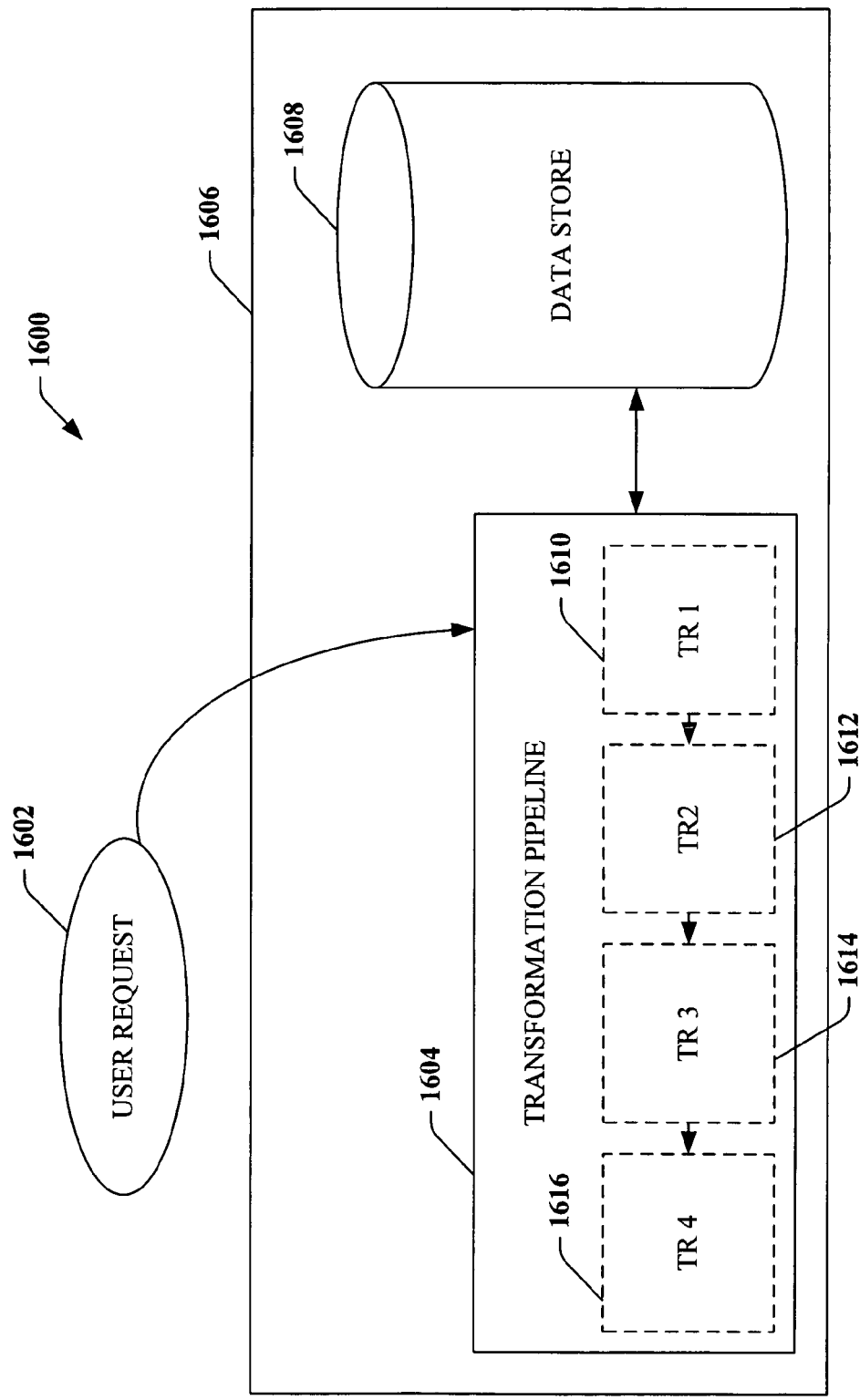
FIG. 16 is a system that facilitates creating an HMI through multiple data transformations.

Now referring to FIG. 16, one exemplary implementation 1600 of an aspect described herein is illustrated. A user request 1602 for generation of an HMI is delivered to a transformation pipeline 1604, which can selectively filter data to enable creation of an HMI. The transformation pipeline 1604 is associated with a data store 1606, which can include data relating to an industrial automation environment. The data store 1606 can include data that conforms to an organizational model (a uniform model across an enterprise), which is made up of organizational units. Each organizational unit includes information relating to the specific part of a production, automation and/or control system that the organization unit models (e.g. control module, equipment module, process cell, line, site, . . . ). The organizational model can be stored in a relational database or an Extensible Markup Language (XML) document, for instance. The organizational model can also include a presentation template or style sheet for each organizational unit in the model. This template is a pre-cursor for the HMI that will eventually be rendered to the user, but requires additional processing before it is rendered. The template can be stored in Extensible Style Sheet Language (XSLT), for instance. A different template can exist for each display device type that a user can employ for each given organizational unit in the organizational model.

Information relating to a provider of the user request 1602, user such as the user's role in the organization, the user's preferences, and the like can also be stored somewhere in the organizational model, and such data can be accessible from a server. Further, information about specific user, role types, and time can be embedded into each organizational unit so as to allow selective access to these organizational units based on user, role, and time.

User interaction with the transformation pipeline 1604 can begin when the user initiates contact with such pipeline 1604 on a particular display device. Rather than ask for a specific screen, page, or file (as is conventional), the user can announce his or her existence (often as part of a logon or authentication procedure). The user's unique identification number can be collected along with the user's initial location, time of day, as well as an identifier representing the type of display device the user is employing to access the transformation pipeline 1604, which can be a traditional workstation, an embedded device, a wireless device, a cellular device, or any other suitable device. This information can represent more than just the user (because information relating to location, time, and device is available), and is referred collectively herein as a client request context. The information can be delivered to the transformation pipeline 1604 that is existent upon a server 1606, wherein the server 1606 hosts the organizational model, and utilized to generate an HMI.

Additional information relating to the user can then be ascertained through utilization of the client request context. The server 1606 includes a data store 1608 that includes user roles and preferences, and such data store 1608 can be queried based at least in part upon the user identification as well as the role that is associated with the user in the organization. Further user preferences can be retrieved from the data store 1608 based on the user identification ID. A set of information can thus exist about the user; the user's identification, the user's role, preferences, the user's location, display device and time. This set of information can be referred to as a "request context." The request context can be processed by the server 1606 in a number of sequential steps (the transformation pipeline 1604) that can apply the request context to the organizational model and transform it into renderable HMI content.

The transformational pipeline begins with a first transformation 1610 that can prune the organizational model in the area of interest to the user, represented by the request context. For instance, location can be used as a parameter for accessing portions of the organizational model. Location can be specified, for example, by naming an organizational unit of interest (e.g., control module, equipment model, process cell, line, site, . . . ), or by specifying approximate physical coordinates in the system. By providing location to the first transformation 1610 some portion (sub-set) of the organizational model data can be returned. A second transformation 1612 can apply user, role, and time accessed from the request context to data returned from the first transformation 1610. The second transformation 1612 can further prune the data returned from then first transformation 1610 so that only data that has been deemed accessible to the user given a certain user role and time can be returned. In some cases the data returned may be empty indicating the user has no access to the data; in other cases the full data from the previous transformation will be returned indicating that the user has full access.

A third transformation 1614 can be applied based upon device, which may accessed from the request context to the data returned from the second transformation 1612 in the transformation pipeline 1604. For instance, this can enable selection of a template with respect to the device. In more detail, large sophisticated display devices can be associated with large, sophisticated templates, whereas small mobile wireless or cellular display devices can be associated with simpler templates. Moreover, user, user role, and time can be applied to the template to determine if access for a given device types is permitted. In a particular example, a template for a cellular device may not be accessible for a specific user, role, and time. Once the template is selected, it can be applied to data resulting from the third transformation 1614. In one analogy, this would be similar to applying an XSLT style sheet to an XML document, where the output is still an XML document, but it is now in a different format. Incidentally, the output can be renderable, since the template can include rendering instructions that are to be applied to the data.

A fourth transformation 1616 can apply preferences, accessed from the request context, to data resulting from the third transformation 1614. As the input to the fourth transformation 1616 is renderable content, such transformation 1616 may be associated more with styling than content, wherein renderable content is formatted according to user preferences. For instance, styling can include, but is not limited to, color themes, layout themes, headers and footers. Upon completion of the fourth transformation 1616, output can be in the form of presentational content that can be rendered to the user on the display device being employed by such user.

Figure 17:
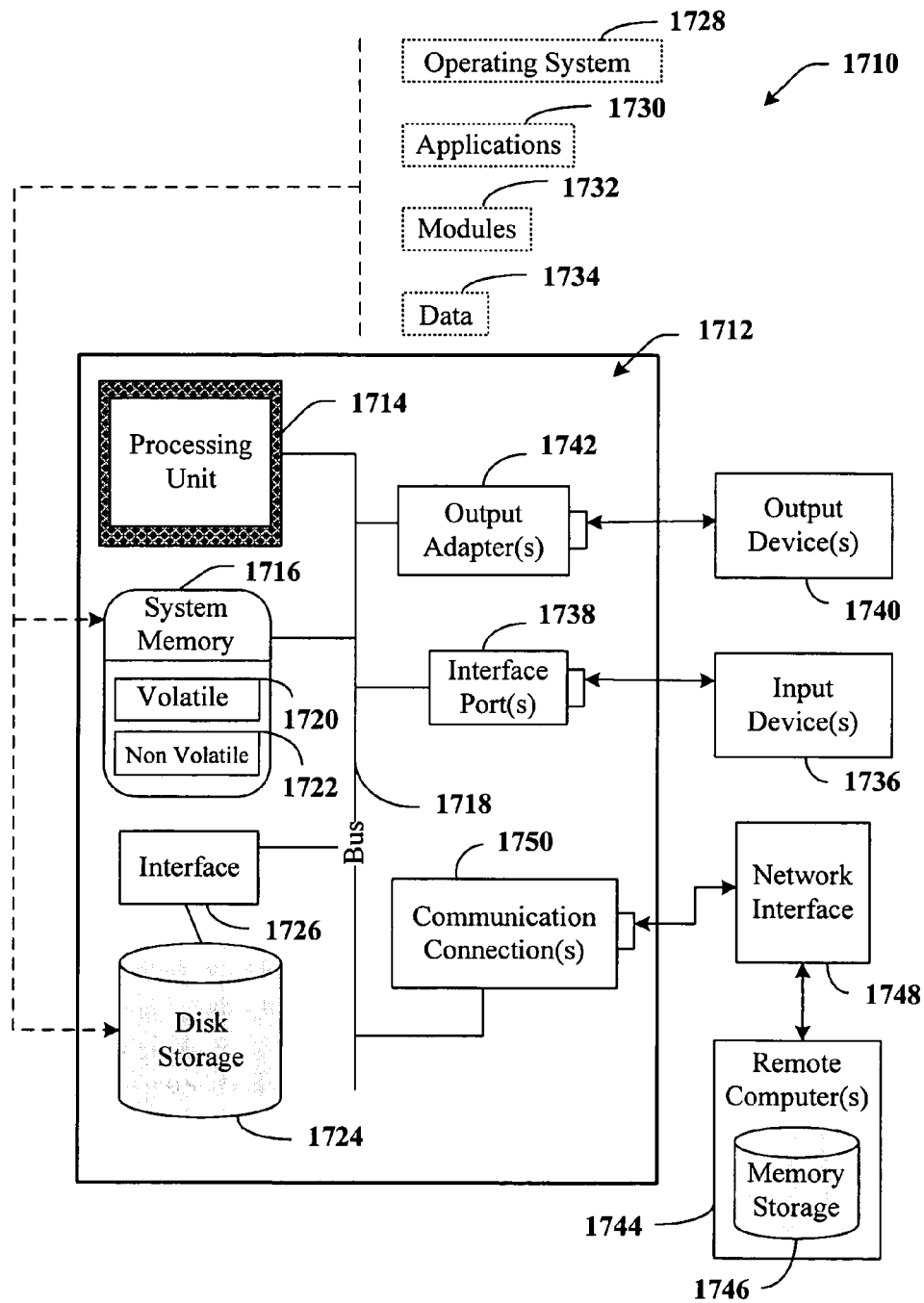
FIG. 17 is an example operating system upon which various features described herein can be implemented.

With reference to FIG. 17, an exemplary environment 1710 for implementing various aspects of the invention includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the subject invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740.

Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

Figure 18:
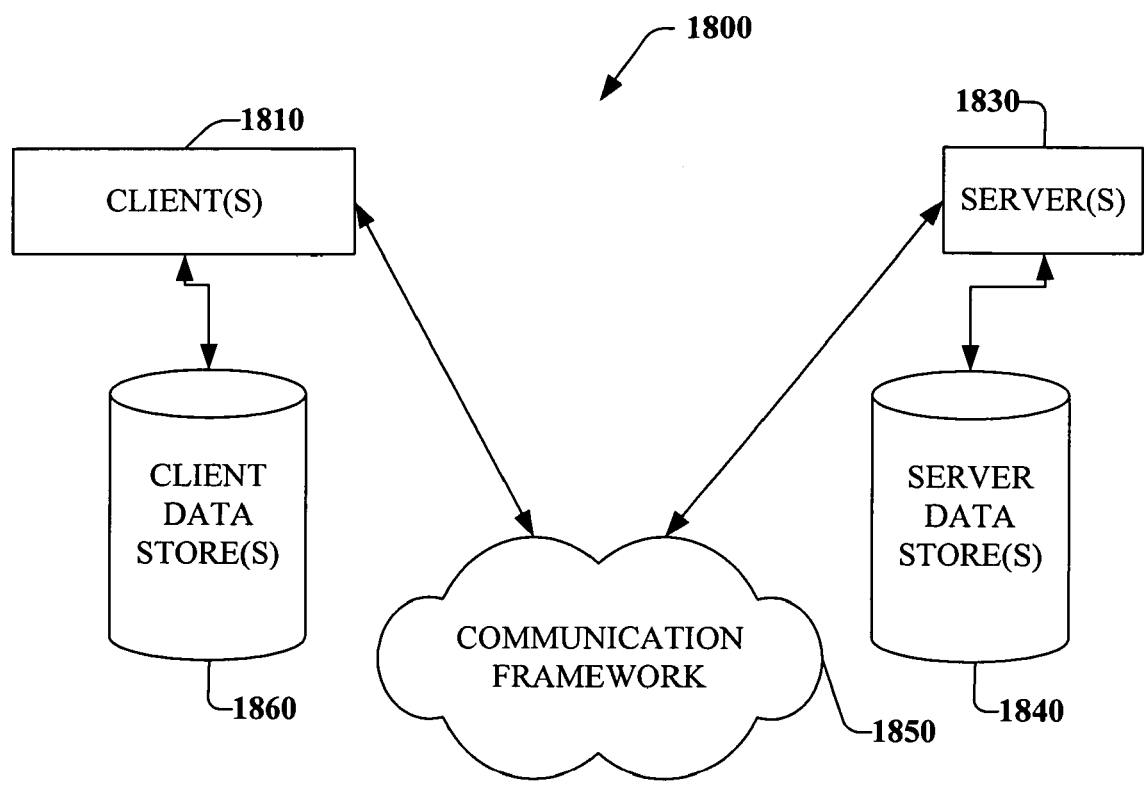
FIG. 18 is an exemplary computing environment within which various features described herein can interact.

FIG. 18 is a schematic block diagram of a sample-computing environment 1800 with which the subject invention can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing the subject invention, for example. One possible communication between a client 1810 and a server 1830 can be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the servers 1830.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A human-machine interface generation system, the system is recorded on a computer-readable storage medium and capable of execution by a computer, comprising:
    a reception component that receives a request to generate a human-machine interface relating to at least one of an industrial system, device, process, or sub-process, the reception component further receives parameters associated with an initiator of the request;
    a query generation component that creates a query based at least in part upon the request and the parameters, and utilizes the query to extract data from a server within an industrial automation environment, the extracted data conforming to a hierarchically structured data model;
    a view generation component that receives the request, the parameters, and the extracted data and generates the human-machine interface based at least in part thereon; and
    a proxy component that facilitates use of data from a programmable logic controller in connection with generating the human-machine interface, the proxy component comprising a mapping component that transforms data from the programmable logic controller into data that conforms to the hierarchically structured data model.

2. The system of claim 1, the proxy component comprises a bridging component that receives data formatted in accordance with a first network protocol and converts the data to a format that accords to a second network protocol.

3. The system of claim 1, the server comprises an aggregation component that aggregates data from multiple controllers.

4. The system of claim 1, the reception component comprises a security component that determines whether an initiator of a request for the human-machine interface is authorized to generate the human-machine interface.

5. The system of claim 1, the reception component comprises a dialog component that generates a dialog related to the received request to extract additional information from a provider of the request.

6. The system of claim 5, the dialog component solicits information through one of text-based inquiries or voice-based inquiries.

7. The system of claim 1, the reception component comprises a voice recognition component that facilitates recognition of user parameters through a voice command.

8. The system of claim 1, the view generation component comprises a tool-tip component that facilitates provision of tool-tips within the human-machine interface.

9. A methodology for creating a human-machine interface comprising the following computer-executable acts:
    receiving a request to generate a human-machine interface related to at least one of an industrial system, device, process, or sub-process;
    determining a user identity associated with a provider of the request;
    determining parameters relating to the provider of the request by accessing a database that includes parameters associated with the user identity;
    generating a query based at least in part upon the at least one of the industrial system, device, process, or sub-process, and the determined parameters;
    providing the query to a server;
    receiving data resulting from the provided query, the data conforming to a hierarchically structured data model;
    creating the human-machine interface in a customized manner based at least in part upon the determined parameters and the received data and at least one of the industrial systems device, process or sub-process; and
    transforming data from a programmable logic controller into data that conforms to the hierarchically structured data model provided in connection with creating the human-machine interface.

10. The methodology of claim 9, further comprising provisioning tool-tips within the human-machine interface.

11. The methodology of claim 9, further comprising:
    receiving the request as a voice request; and
    determining the parameters based upon an analysis of the voice request.

12. The methodology of claim 9, further comprising:
    aggregating data from a plurality of controllers; and
    utilizing the aggregated data to create the human-machine interface.

13. The methodology of claim 9, further comprising determining that the provider of the request is authorized to create the human-machine interface.

14. The methodology of claim 9, the parameters include identity of the provider of the request, role of the provider of the request, display device parameters, location of the provider of the request, and location of a object of the request.

15. A human-machine interface generation system, the system is recorded on a computer-readable storage medium and capable of execution by a computer, comprising:
    means for receiving data relating to a device;
    means for receiving parameters relating to a user requesting generation of a human-machine interface;
    means for creating a query based on the received parameters;
    means for accessing a server that includes associations relating to the parameters and extracting data from the server in accordance with the query, the extracted data conforming to a hierarchically structured data model;
    means for automatically creating the human-machine interface for the device based at least in part upon the received parameters and the extracted data; and
    means for transforming data from a programmable logic controller into data that conforms to the hierarchically structured data model provided in connection with creating the human-machine interface.

16. The system of claim 15, further comprising:
    means for aggregating data from a plurality of controllers; and
    means for utilizing the aggregated data to create the human-machine interface.

17. The system of claim 15, further comprising means for determining the parameters based at least in part upon voice commands.

* * * * *

UNITED STATES PATENT AND TRADEMARK OFFICE
CERTIFICATE OF CORRECTION

PATENT NO. : 7,650,196 B2  Page 1 of 1
APPLICATION NO. : 11/239925
DATED : January 19, 2010
INVENTOR(S) : Kevin G. Gordon et al.

It is certified that error appears in the above-identified patent and that said Letters Patent is hereby corrected as shown below:

In column 18, line 13, delete "systems" and replace with "system,".

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,650,196 B2  Page 1 of 1
APPLICATION NO. : 11/239925
DATED : January 19, 2010
INVENTOR(S) : Gordon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 685 days.

Signed and Sealed this

Twenty-third Day of November, 2010

David J. Kappos
*Director of the United States Patent and Trademark Office*